Oct. 6, 1942.   C. W. TRUXELL, JR., ET AL   2,297,817
FILTER ELEMENT AND METHOD OF MAKING THE SAME
Filed Jan. 30, 1939
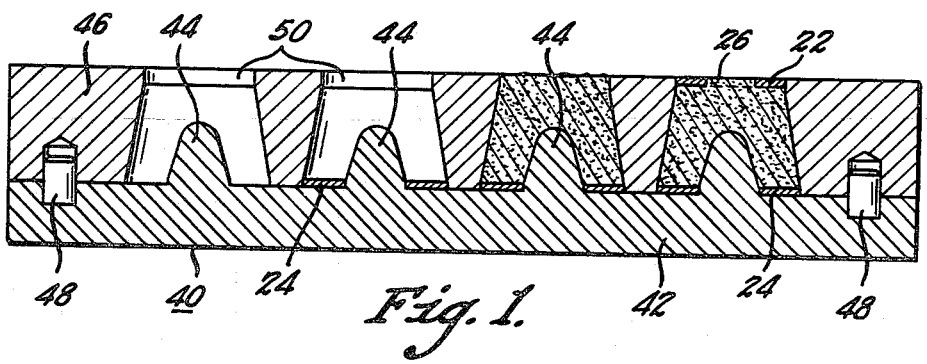
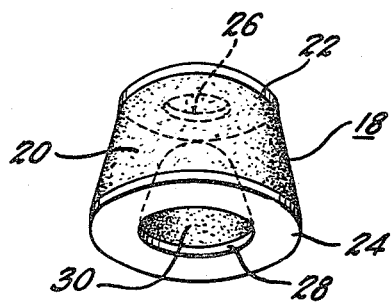
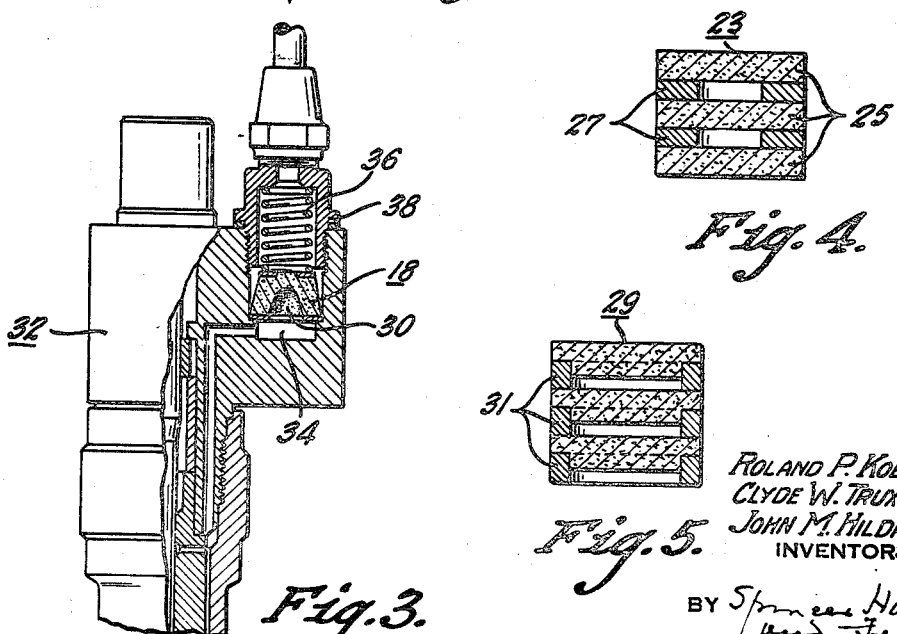
ROLAND P. KOEHRING
CLYDE W. TRUXELL, JR.
JOHN M. HILDABOLT
INVENTORS
BY Spencer Hardman
and Feder
THEIR ATTORNEYS Patented Oct. 6, 1942

2,297,817

UNITED STATES PATENT OFFICE 2,297,817

FILTER ELEMENT AND METHOD OF MAKING THE SAME

Clyde W. Truxell, Jr., Northville, Mich., and Roland P. Koehring and John M. Hildabolt, Dayton, Ohio, assignors to General Motors Corporation, Detroit, Mich., a corporation of Delaware Application January 30, 1939, Serial No. 253,596

9 Claims. (Cl. 210—205)

This invention relates to an improved filter element and method of making the same.

An object of the invention is to provide a filter element made from highly porous sintered metal which includes an apertured plate bonded thereto for reinforcing the filter and for metering the flow of fluid to be passed therethrough.

Another object of the invention is to provide an inwardly extending cored depression within said element for increasing the filtering capacity thereof.

A still further object is to align the surface opening of said cored depression with the aperture in said plate.

A further object is to provide bronze, iron or nickel-copper, etc., filter elements of the type heretofore described.

Another object is to provide a method for making filters as defined in the proceeding objects wherein the filters may be molded from loose non-compacted powder, and bonded in situ to the apertured plate or plates during the sintering operation.

Further objects and advantages of the present invention will be apparent from the following description, reference being had to the accompanying drawing wherein a preferred embodiment of the present invention is clearly shown.

In the drawing:

Fig. 1 is a cross-sectional view of a mold used in the production of filter elements wherein the steps in the method of manufacture are shown in successive mold cavities.

Fig. 2 is a view in perspective of a preferred form of filter element.

Fig. 3 is a fragmentary view partly in section of a Diesel fuel injector showing one of the many uses of the present type filter.

Fig. 4 shows another type of filter element utilizing a plurality of flat porous plates, and Fig. 5 is a view of a modification of the filter shown in Fig. 4.

Referring to the drawing, a preferred form of filter element 18 is shown in Fig. 2, wherein the main body 20 of the element comprises a highly porous sintered metal mass. The body 20 of the element 18 is preferably of truncated conical shape, but it is manifest that this shape may be altered to meet specific requirements. A pair of circular plates 22 and 24 made from steel, copper or nickel sheet material etc. are bonded by an alloy bond to the body 20 at either end thereof. The plates are provided with central apertures 26 and 28 therethrough, respectively, and these apertures are in substantial alignment. The plates 22 and 24 act as reinforcing means for the filter element so that the element may be clamped within a pipe or tube without deforming the porous metal or destroying the porosity thereof. The apertures 26 and 28 have the further function of acting as a metering means if such action is desired, so that only a measured quantity of fluid can pass through the filter per unit time. It is apparent that if the metering function of the filter is not desired that the apertures can be made sufficiently large to eliminate this metering action.

In some cases it is desirable to increase the filter capacity of the element by increasing the filter area thereof. This may be accomplished by providing an inwardly extending cored portion 30 within the body 20. The cored depression 30 preferably has the walls thereof substantially parallel to the corresponding outer walls of the body 20. The surface opening of the depression 30 is substantially aligned, or in register, with the aperture 28 of plate 24.

Fig. 3 shows a filter application for one of the many instrumentalities in which filters of the type described may be employed. In this instance a filter element 18 is used in a Diesel injector 32. The filter element 18 is held in place within a cavity 34 by means of a spring 36 and a locking member 38. It is apparent by referring to the drawing that the truncated conical shape of the element 18 permits fluid to seep through from all sides thereof, since the taper on the element 20 provides an annular gap between the element and the walls of the cavity 34.

Fig. 4 shows a modified design of filter element 23 in which a plurality of flat plates 25 of porous metal are separated by a plurality of washers 27 which may be bonded to the plates or may merely be interposed therebetween. In this instance, if a metering action is desired, the central aperture of the washer is calibrated to pass the desired quantity of fluid as shown in Fig. 4. The filter 29, illustrated in Fig. 5, is not desirable as a metering device. In this case a solid metal sleeve 31 is used which encloses any desired portion of the porous metal. Filters 23 and 29 are particularly desirable for built up units, in which any number of plates or wafers may be stacked to provide the desired filtering action. Either of these embodiments can be fabricated by the method used in making filters as disclosed in Fig. 2.

The present invention further comprehends a simple and inexpensive method of making filters as heretofore described. Referring to Fig. 1, a mold 40 is shown which includes a base plate 42 having a plurality of upwardly extending cores 44 thereon. A mold member 46 is provided, which is preferably keyed by means of pins 48 to the plate 42 for aligning purposes, and which includes a plurality of openings 50 therethrough, each having a shape corresponding to the desired shape of the filter element. The openings 50 are disposed to register with the cores 44 so that the cores are substantially centrally located within the openings 50, when the plate 42 and member 46 are assembled. In practice the plate 42 and member 46 are fabricated from graphite although they can be made from metallic material such as; steel, chrome steel, in which case it is necessary to dust the internal mold surfaces with Alundum or a graphite powder to prevent the molded article from sticking to the mold during sintering. These molds are preferably of the multiple type in which a number of elements may be made simultaneously.

In the manufacture of filter elements a plurality of washers or plates 24 are placed over the cores 44. These plates 24 are preferably copper plated steel although they may be plain steel, copper or nickel etc. After the plates 24 have been assembled on the cores 44, the mold member 46 is put in place so that the openings 50 therethrough fit over the plates 24, this position being shown in the second cavity of the mold shown in Fig. 1. The powdered metal is next loosely filled into the cavity formed by the opening 50 in the member 46 and the plate 42. The second washer or plate 22 is then placed on top of the powdered metal as shown in the fourth cavity of Fig. 1, and is lightly pressed downwardly until substantially parallel with the surface of the member 46. The assembled mold with the metal powder therein is then placed in a sintering furnace and heated under non-oxidizing conditions at such a temperature and for such a time sufficient as will cause the metal particles to sinter together and simultaneously cause the plates 22 and 24 to bond by an alloy bond to the porous metal. The mold is next cooled under non-oxidizing conditions which causes the porous metal to shrink slightly at which time the mold member 46 may be removed and the finished filter elements taken from the plate 42. When making the filters shown in Figs. 4 and 5, the cores 44 must be of such a length that they do not extend into the powdered metal, but merely pass through the aperture of the washer to align the same in the mold.

Filter elements may be made from any number of metal powders such as bronze powder, iron powder, copper powder, mixtures of copper and tin powder, mixtures of copper and nickel etc. When sintering single metal powders it is desirable to utilize a temperature slightly below the melting point of the metal powder, for example when sintering copper powder a temperature of 1800° F. is desirable. When sintering powder metal mixtures the sintering temperature should be intermediate the melting points of the powders, for example, when sintering copper-tin mixtures the sintering temperature should be in the neighborhood of 1500° to 1600° F., which is above the melting point of tin and below the melting point of copper. In this case, inter-metallic diffusion occurs which results in the formation of a bronze. Mixtures of 90% copper and 10% tin or any of the other conventional bronze formulas may be used as starting products. In all of the aforementioned cases a sintering time of from 20 minutes to an hour may be utilized successfully. It is to be understood that the sintering time and temperature are not critical, but may vary considerably. Thus with lower sintering temperatures it is desirable to increase the time of heating and vice versa.

In any of the embodiments described a subsequent compacting step may be employed if desired. In this manner the final porosity of the element may be closely controlled, and likewise by use of various compacting pressures, a number of varying porosity filters may be made from the same stock of sintered material. It has been found that pressing in one plane only is usually sufficient, for example along the vertical axis of the article.

Another modification of the invention consists of utilizing an apertured plate of a mere dense metal having one or more slits or holes therethrough, and then spreading loose powdered metal thereover either in a mold if a heavy layer is required or without a mold if a thin layer is sufficient. The assembly is then heated to sinter together the powdered metal and simultaneously bond the sintered metal layer to the plate so that the sintered metal bridges the aperture or apertures to provide a reenforced filter element.

From the foregoing it will be apparent that we have provided a combination metering and filter element which has a wide field of use in industry. We have further provided an inexpensive method of producing filter elements, such a method requiring inexpensive equipment and producing satisfactory articles of any desired shape according to the configuration of the mold.

While the embodiment of the present invention as herein disclosed, constitutes a preferred form, it is to be understood that other forms might be adopted, all coming within the scope of the claims which follow.

What is claimed is as follows:

1. A new article of manufacture for use in the filtration of fluids comprising, a highly porous mass of sintered metal made by sintering together loose, non-compacted metal powders including spaced apertured plates of a more dense metal bonded thereto with the apertures in substantial alignment.

2. A new article of manufacture for use in the filtration of fluids comprising, a highly porous mass of sintered metal made by sintering together loose, non-compacted metal powders including an apertured plate of more dense metal bonded thereto.

3. A new article of manufacture for use in the filtration of fluids comprising, a highly porous mass of sintered metal made by sintering together loose, non-compacted metal powders of a truncated conical shape and including spaced apertured plates of a more dense metal bonded thereto at either end thereof with the apertures in substantial alignment.

4. A new article of manufacture for use in the filtration of fluids comprising, a highly porous mass of sintered metal made by sintering together loose, non-compacted metal powders of a truncated conical shape and including an apertured plate of a more dense metal bonded thereto at one end thereof.

5. A new article of manufacture for use in the filtration of fluids comprising, a highly porous mass of sintered metal made by sintering together loose, non-compacted metal powders having a substantially cylindrical shape and including a cored portion extending inwardly a substantial distance for forming a cup portion, said cored portion decreasing the effective thickness of the porous metal for increasing the fluid flow capacity therethrough.

6. A new article of manufacture for use in the filtration of fluids comprising, a substantially cylindrical mass of highly porous bronze made by sintering together loose, non-compacted metal powder having an apertured plate of a more dense metal bonded at one end thereof.

7. A new article of manufacture for use in the filtration of fluids comprising, a substantially cylindrical mass of highly porous bronze made by sintering together loose, non-compacted metal powder having apertured plates of a more dense metal bonded at either end thereof, and including an inwardly extending cored portion having the walls thereof substantially parallel to the corresponding outer walls of the article, and having the entry thereto in substantial alignment with the aperture of one of said plates.

8. A new article of manufacture for use in the filtration of fluids comprising, a substantially cylindrical mass of highly porous metal made by sintering together non-compacted metal powder and having apertured plates of a more dense metal bonded at either end thereof, and including an inwardly extending cored portion having the walls thereof substantially parallel to the corresponding outer walls of the article, and having the entry thereto in substantial alignment with the aperture of one of said plates.

9. A new article of manufacture for use in the filtration of fluids comprising, an apertured reenforcing member of a dense non-porous metal and having a highly porous metal mass made by sintering together non-compacted metal powders bonded thereto and bridging the apertured portion of the dense metal member.

CLYDE W. TRUXELL, JR.
ROLAND P. KOEHRING.
JOHN M. HILDABOLT.